United States Patent [19]
Nachman

[11] Patent Number: 5,530,558
[45] Date of Patent: Jun. 25, 1996

[54] INTERFACE CIRCUIT FOR UTILIZING A FACSIMILE COUPLED TO A PC AS A SCANNER OR PRINTER

[76] Inventor: Bruce Nachman, 48 Main St., Wayne, Pa. 19087

[21] Appl. No.: 226,278

[22] Filed: Apr. 11, 1994

[51] Int. Cl.⁶ ................................................. H04N 1/32
[52] U.S. Cl. ........................................ 358/442; 358/468
[58] Field of Search ................................. 358/442, 443, 358/400, 468, 471, 401, 434, 440; 379/100, 251, 252, 375; 348/14–20

[56] References Cited

U.S. PATENT DOCUMENTS

| | | | |
|---|---|---|---|
| 4,652,933 | 3/1987 | Koshiishi | 358/442 |
| 4,825,465 | 4/1989 | Ryan | 379/100 |
| 4,924,494 | 5/1990 | Shung | 379/100 |
| 4,964,154 | 10/1990 | Shimotono . | |
| 4,991,200 | 2/1991 | Lin . | |
| 5,157,519 | 2/1992 | Jacobs . | |

Primary Examiner—Edward L. Coles, Sr.
Assistant Examiner—Fan Lee
Attorney, Agent, or Firm—Louis Weinstein

[57] ABSTRACT

Apparatus for interfacing a conventional facsimile machine with a PC enabling the use of the facsimile machine as a scanner or printer. A first switch assembly selectively couples the PC modem and facsimile machine either to independent telephone lines in a normal mode or to one another in a scan/print mode. A manually operated switch assembly is depressed for a brief interval sufficient to activate a ringing circuit which converts DC power from a small battery source to a 20 Hz sine wave of 90 volt amplitude and applies the sine wave signal to the PC to cause the PC or facsimile to enter into a scan or print mode, respectively. The manually operable switch is then released to apply a constant current to the facsimile machine to simulate an off-hook condition. A facsimile machine start button is then operated to start the facsimile machine which scans documents provided therein and transmits the scanned data in a conventional facsimile transmission format or activate the PC to transmit a fax in conventional facsimile transmission format to utilize the facsimile machine as a printer. The PC may be equipped with a suitable software program for converting non-graphic, i.e. such as word-type information into a binary format suitable for use in word processing applications and may store the data in a memory for subsequent use. An automatic circuit (25) may be provided to initiate a scanning or printing mode responsive to receipt of a unique number received from either the facsimile machine or the PC, thus eliminating the need for switches.

32 Claims, 7 Drawing Sheets

5,530,558

INTERFACE CIRCUIT FOR UTILIZING A FACSIMILE COUPLED TO A PC AS A SCANNER OR PRINTER

FIELD OF THE INVENTION

The present invention relates to interfacing a facsimile with a PC and more particularly to an interface circuit of highly simplified design and including a novel ringing circuit capable of generating a sine wave of a given amplitude and frequency from a small, portable DC battery or 9 V DC power supply.

BACKGROUND OF THE INVENTION

As is well known in the art, a conventional facsimile scans documents and transmits the scanned information through a modem in a standard facsimile format to a remote facsimile which receives the transmitted data by a modem and converts the transmitted data into a form for printing a document which is a replica of the document scanned by the transmitting facsimile.

Scanning and printing devices especially adapted for use with PCs (i.e. personal computers) are relatively expensive devices typically costing many hundreds of dollars to as much as several thousands of dollars for applications requiring character recognition capabilities.

It has been recognized that conventional facsimile machines may be utilized as scanners or printers for PCs. However, the interface devices presently available are both complicated and expensive and typically require a microprocessor which further tends to increase both cost and circuit complexity.

OBJECT OF THE INVENTION

It is, therefore, a principal object of the present invention to provide a circuit for interfacing a PC and a facsimile to enable the facsimile to be utilized as a scanner or a printer for a PC and to accomplish all of the objectives of a scanner or a printer in a simple straightforward manner through the use of a circuit of highly simplified design and low cost.

BRIEF DESCRIPTION OF THE INVENTION

The present invention achieves all of the above as well as other objectives through apparatus which is characterized by comprising first switch means capable of selectively coupling a PC modem and a facsimile modem to independent telephone lines when in a non-scanning/printing mode and for decoupling the PC and facsimile modems from the telephone lines and coupling these modems to one another when placed in a scanning/printing mode.

Second manually operable switch means activates a novel ringing circuit which generates a sine wave of appropriate amplitude and frequency and applies this ringing circuit to the PC modem, when used as a scanner or to the facsimile when being used as a printer, causing the PC or facsimile machine to respond to the simulated transmit request.

Release of the circuitry operating button causes the interface circuitry to apply an off-hook condition to the facsimile. Document scanning or printing is initiated by pressing the facsimile start button or the start button provided as part of the PC or by a program step integrated into the PC as part of a print mode (selecting the facsimile as the output device for printing). Transmitted data may be directly stored in a PC memory. Documents incorporating alphanumeric data may be converted by a software program incorporated into the PC.

The ring generating circuit responsive to pressing of the operating button generates a transmit request signal by converting the low voltage from a DC source into a 20 cycle sine wave of 90 volt amplitude through the employment of a pulse generating circuit coupled to phase delay means and applying phase delayed and undelayed pulses to a transistorized switching circuit for selectively applying positive DC voltage to opposing inputs of a step-up transformer which applies a boosted sinusoidal ring signal to the PC modem, the ring generating circuit generating a ringing signal of the appropriate amplitude and frequency in a highly simplified and inexpensive manner. Since operation of the ringing circuit is completed in less than two seconds, a battery, if used, will have an extremely long operating life. Alternatively, if a 9 V DC power source is used the battery is not required at all.

The simple, straightforward operation of only three switches eliminates the need for complicated, expensive and typically microprocessor-based circuitry.

BRIEF DESCRIPTION OF THE FIGURES

The above, as well as other objects of the present invention, will become apparent upon reading the accompanying description and drawings in which.

DETAILED DESCRIPTION OF THE INVENTION AND PREFERRED EMBODIMENTS THEREOF

Figure 1:
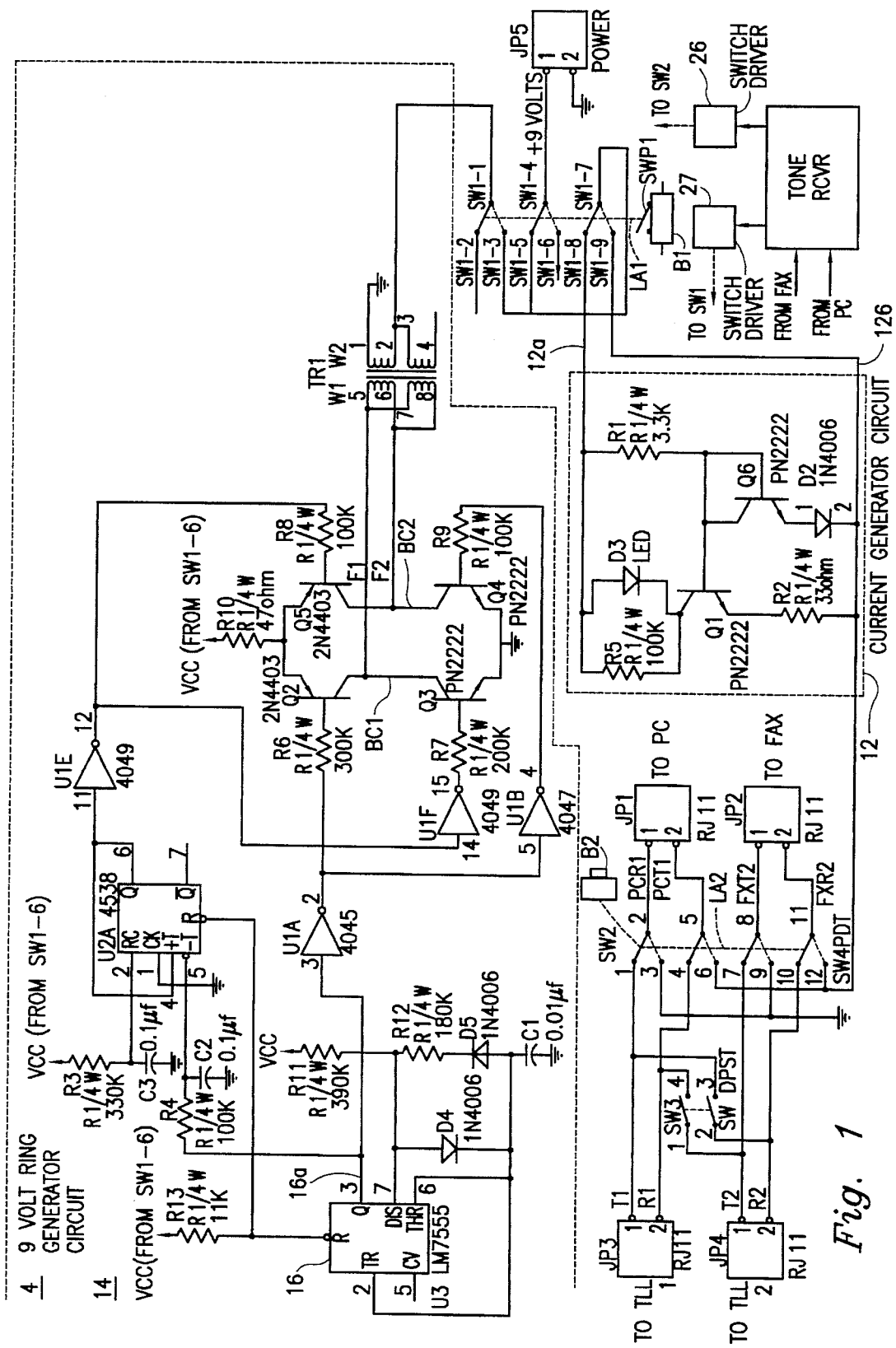
FIG. 1 is a circuit diagram of the interface circuitry of the present invention which enables a PC to utilize a conventional facsimile as a sophisticated scanner or printer.

FIG. 1 shows an interface circuit 10 embodying the principles of the present invention and being comprised of a switch assembly SW2 which is a four-pole double-throw switch having four movable switch arms SW2-2, SW2-5, SW2-8, and SW2-11, each cooperating with a pair of stationary contacts, as shown. For example, and for simplicity, note that switch arm SW2-2 is switchable between stationary contacts SW2-1 and SW2-3.

Movable switch arms SW2-2, SW2-5, SW2-8 and SW2-11 are all ganged to operate in unison as shown by common operating button B2 coupled to the switch arms through a linkage arm LA2 shown in schematic fashion as a dotted line. The switch is designed so that the switch arms are retained in the positions to which they are moved.

The switch arms are arranged in pairs, switch arms SW2-2 and SW2-5 selectively coupling a modem of a PC (not shown for purposes of simplicity) to either a first telephone line #1 through jumper JP3 or directly to a local facsimile machine (not shown for purposes of simplicity) through a jumper terminal JP2.

In a similar fashion, a pair of switch arms SW2-8 and SW2-11 selectively couple the local facsimile machine through jumper JP2 to either a separate telephone line #2 (through jumper JP4) or to the modem of the PC.

A double-pole single-throw switch SW3 is provided to couple either the local facsimile machine or the PC modem to a single telephone line or alternatively, disconnects the PC modem and facsimile machine from the common telephone line. For example, in applications where both the local facsimile and the PC each have an independent, dedicated telephone line, switch SW3 remains open. In applications where only a single telephone line is provided, both PC and the local facsimile may share the single telephone line by gaining access thereto in a staggered manner.

Switch SW1 which is a three-pole, double-throw switch, comprises three movable switch arms SW1-1, SW1-4 and SW1-7, each movable switch arm cooperating with a pair of stationary switch arms.

Movable switch arm SW1-1 selectively couples the output terminal of the pair of secondary windings W2 of a step-up transformer TR1 either to stationary terminal SW1-2, which isolates the output of the transformer TR1 from the operating circuitry, or stationary contact SW1-3 which couples the secondary winding W2 of transformer TR1 through movable switch arm SW1-7 and stationary contact SW1-9 simultaneously to stationary contacts SW2-6 and SW2-12 of four-pole double-throw switch SW2 for simultaneous connection to the PC modem and the local facsimile, when switch arms SW2-5 and SW2-11 respectively engage stationary contacts SW2-6 and SW2-12.

Movable switch arm SW1-4 selectively couples a small nine volt (9 V) DC source (through jumper JP5) to either stationary switch arm SW1-5 for coupling nine volt (9 V) DC to a current generator circuit 12 or alternatively coupling nine volt (9 V) DC to stationary terminal SW1-6 which in turn provides DC power to the nine volt (9 V) ring generator circuit 14 arranged within the dotted region as shown.

Current generator circuit 12 is comprised of resistors R1, R2 and R5, transistors Q1 and Q6, diode D2 and LED-type diode D3 which are connected in the manner shown to provide a constant current which simulates an off-hook signal, utilized in the manner to be more fully described hereinbelow. Resistor R2 serves as a current limiting resistor. LED D3 lights to denote operation of the constant current generator.

Ring generator circuit 14, which is utilized to generate a 20 Hz sine wave of a 90 volt amplitude, comprises a 555-type timing circuit 16 which, when activated by a nine volt DC input, applied to timer 16 through terminal VCC and resistor R13, provides a pulse train of equal width, positive-going pulses at a pulse rate of approximately 20 Hz at its output 16a.

The pulse train generated by the 555 timer 16 is simultaneously applied to the input of inverter U1A whose output is simultaneously coupled to the base electrodes of transistors Q2 and Q4, through resistor R6 and through inverter U1B and resistor R9.

The pulse train, as was set forth hereinabove, is simultaneously coupled to the −T input of a one-shot multivibrator U2A operating as a phase delay circuit and whose Q output is coupled to the input of inverter U1E. The Q output of one-shot multivibrator U2A provides a phase delayed pulse which is coupled through the output of inverter U1E simultaneously to the base of transistor Q5 through resistor R8 and to the base of transistor Q3 through inverter U1F and resistor R7. Transistors Q2–Q5 and resistors R6–R9, together with resistor R10, form a full bridge switching circuit which is powered by the nine volt (9 V) DC source applied to the terminal VCC to provide drive current sufficient to drive transformer TR1, comprised of a pair of primary windings W1 and a pair of secondary windings W2, to generate a sine wave output. The primary of TR1 is comprised of a pair of primary windings W1-1 and secondary windings W2 coupled in parallel and the windings W1 and W2 are arranged to provide a step-up transformer to magnify the input voltage preferably by ten to one (10:1), generating the desired output voltage which, in the present application, is a 20 Hz output of 90 volt amplitude with 15 mils of current from a nine volt (9 V) DC, 150 mils current source. If desired, the frequency, amplitude and current of the circuit can be changed by selecting different component values for the passive elements. The component values chosen in the present invention have been selected to generate a signal which reproduces a standard bell ring signal employed in a conventional transmission between remote facsimile machines. The branch circuits BC1 and BC2 of the bridge circuit are alternately rendered conductive to alternately apply a positive voltage to opposing inputs of the input windings W1 for generating a sine wave from the positive-going pulses produced by timer circuit 16. The two input windings W1 are coupled in parallel as are the output windings W2-1 and W2-2.

The bell ring signal is selectively supplied through movable switch arm SW1-1 of the three-pole, double-throw switch SW1 described hereinabove.

The operation of the interface circuit of the present invention is as follows:

Assuming that the local facsimile is desired to be operated in combination with the PC and to function as a scanner, the switch SW2 is moved from the normal position, in which the movable switch arms are shown in solid line fashion, to the dotted line position, simultaneously disconnecting the PC modem and the local facsimile from the telephone lines and directly connecting the PC receive line, PCR1 to ground and the PC transmit line PCT1 directly to stationary contact SW1-6. The local facsimile transmit line FXT2 is directly connected to ground and the facsimile receive line FXR2 is connected in common with line PCT1 through SW2-11 and SW2-12 to stationary contact SW1-6 of switch SW1. Switch SW3 may be either in the open or the closed position when switch SW2 is moved to the scan mode.

Switch SW1 is then operated by pressing button B1 which is ganged to the movable switch arms SW1-1, SW1-4 and SW1-7 by a common linkage arm represented schematically by dotted line LA1. A biasing member or spring SWP1 normally biases the movable switch arms to the solid line position shown in FIG. 1. By depressing switch button B1, the switch arms SW1-1, SW1-4 and SW1-7 are simultaneously moved to the dotted line positions shown in FIG. 1. Button B1 is maintained in the depressed position for a period preferably between one and two seconds. In the dotted line position, the nine volt (9 V) DC source is coupled through jumper JP5 and switch arm SW1-4 and stationary terminal SW1-6 to the VCC terminals of ring generator circuit 14, producing a 20 Hz sine wave of 90 volt amplitude and a current of 15 mils at the secondary windings W2, which is applied to the PC line PCT1 through SW1-1, SW1-3, SW1-7, SW1-9, conductor 126, SW2-6 and SW2-5, simulating what the PC believes is a request by a "remote" facsimile to transmit data thereto. The PC, which may be any type of computer (including but not limited to an Apple Macintosh, IBM PC, PCAT or PCXT) and is provided with either an internal or external group III facsimile interface board, and shifts to a receive mode for receiving what appears to the PC to be a facsimile transmission from a "remote" facsimile machine.

After holding the button B1 depressed for a time which need not exceed approximately two seconds, button B1 is released, causing the nine volt (9 V) DC source to be coupled to input 12a of current generator circuit 12, which circuit applies the constant current to the facsimile receive line FXR2 to create what appears to the facsimile machine to be an off-hook condition. Simultaneously therewith, LED D3 lights indicating that the current generator circuit is presently in operation.

The local facsimile machine recognizes the constant current as representative of an off-hook condition preparing the local facsimile machine for transmission.

Thereafter, the conventional start button of the facsimile machine (not shown for purposes of simplicity) is pressed to start communication of the data scanned by the local facsimile machine from a document (or documents) placed within the facsimile machine document input (also not shown for purposes of simplicity).

The facsimile machine may be either a group I, group II, or group III machine, although optimum document resolution can be obtained through the use of a group III facsimile machine.

The conventional PC can store the transmitted data in its memory as a "picture" the resolution of the picture being 200 by 100 pixels for old facsimile machines, 200 by 200 pixels for standard facsimile machines and 400 by 400 pixels for new facsimile machines. Alternatively, a conventional OCR software package such as, for example, a CAERE OCR program available from Bitsoftware may be employed. Many alternative OCR software packages may be utilized to convert the "picture" transmitted by the facsimile machine to binary character form for word processing use or the like.

Operation of the facsimile machine in combination with the PC wherein the facsimile machine operates as a printer is as follows:

The ring generating circuit is not required to be operated in this mode and in applications where a facsimile machine is interfaced with a PC for use only as a printer, the ring generating circuit and the cooperating spring bias switch may be eliminated.

Switch SW2 shown in FIG. 1 is moved from the solid line to the dotted line position decoupling the PC and facsimile machine from the telephone lines and coupling the PC and facsimile machine together.

Switch SW1 is operated to power the current generator circuit 12 causing both the PC and the facsimile machine to see an off-hook condition.

The computer PC is operated either by providing a switch such as a push button switch (not shown for purposes of simplicity) to enter into a standard protocol with the facsimile machine and thereafter to transmit information in standard facsimile machine format. The facsimile machine senses that it is communicating with a remote facsimile machine and creates a document in accordance with the data received from the PC in "pixel" form. The PC may be provided with a standard program having a print mode in which the facsimile machine is identified in the printing routine as the specific output device being utilized during such a print mode. Upon completion of printing mode, switch SW2 may be returned to the solid line position decoupling the PC from the facsimile machine and recoupling the PC and facsimile modems to their associated telephone lines.

FIGS. 2a–2e show various arrangements in which the present invention may be utilized.

Figure 2A:
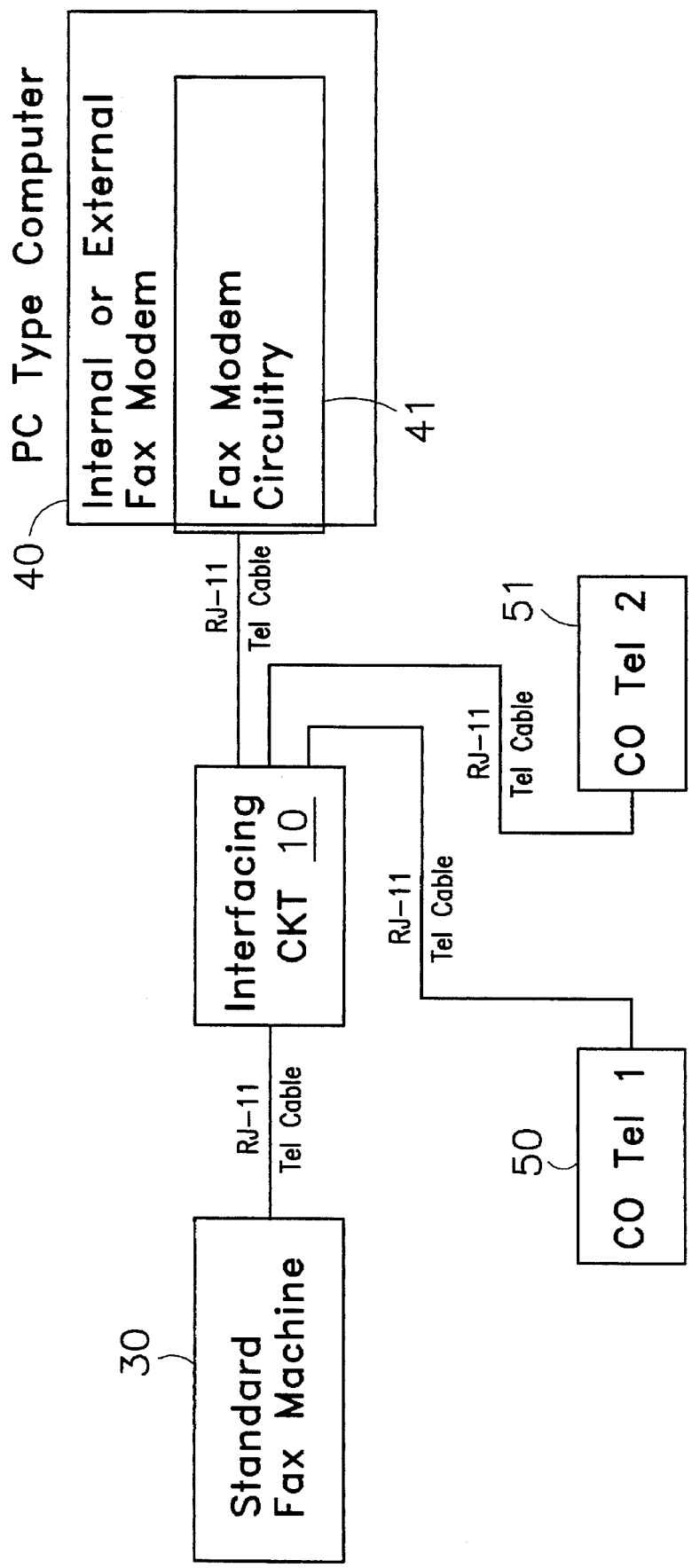
FIGS. 2a–2e show simplified block diagrams of various system arrangements employing the circuitry of the present invention.

Noting, for example, FIG. 2a, the circuitry 10 of the present invention is coupled between a standard facsimile machine 30, a PC-type computer 40 having a facsimile modem circuitry 41 and central office telephone lines 50 and 51. In the arrangement shown in FIG. 2a, the facsimile modem circuitry may be either internal or external to the PC-type computer 40.

Figure 2B:
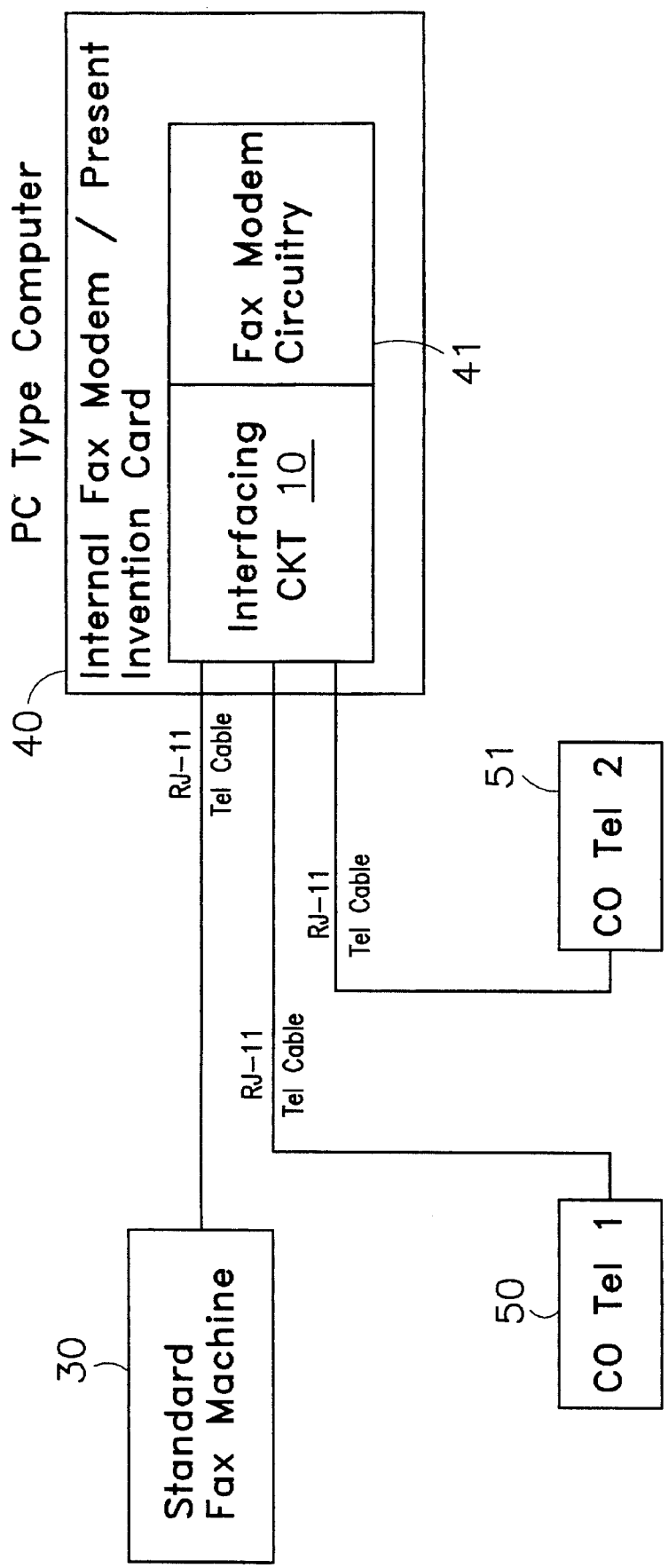

FIG. 2b shows another alternative embodiment in which the circuitry of the present invention is incorporated into the PC-type computer and may be arranged on its own printed wiring board or on a printed wiring board which is common to the circuitry 10 of the present invention and the facsimile modem circuitry 41. The arrangement of FIG. 2b is otherwise the same as that shown in FIG. 2a. The circuit 10 shown in FIG. 2b is provided with three RJ-11 telephone cable connections for respective connection with the facsimile machine 30 and telephone lines 50 and 51. If only one additional telephone cable is provided, the standard facsimile machine 40 and the internal facsimile modem 41 may share that cable.

Figure 2C:
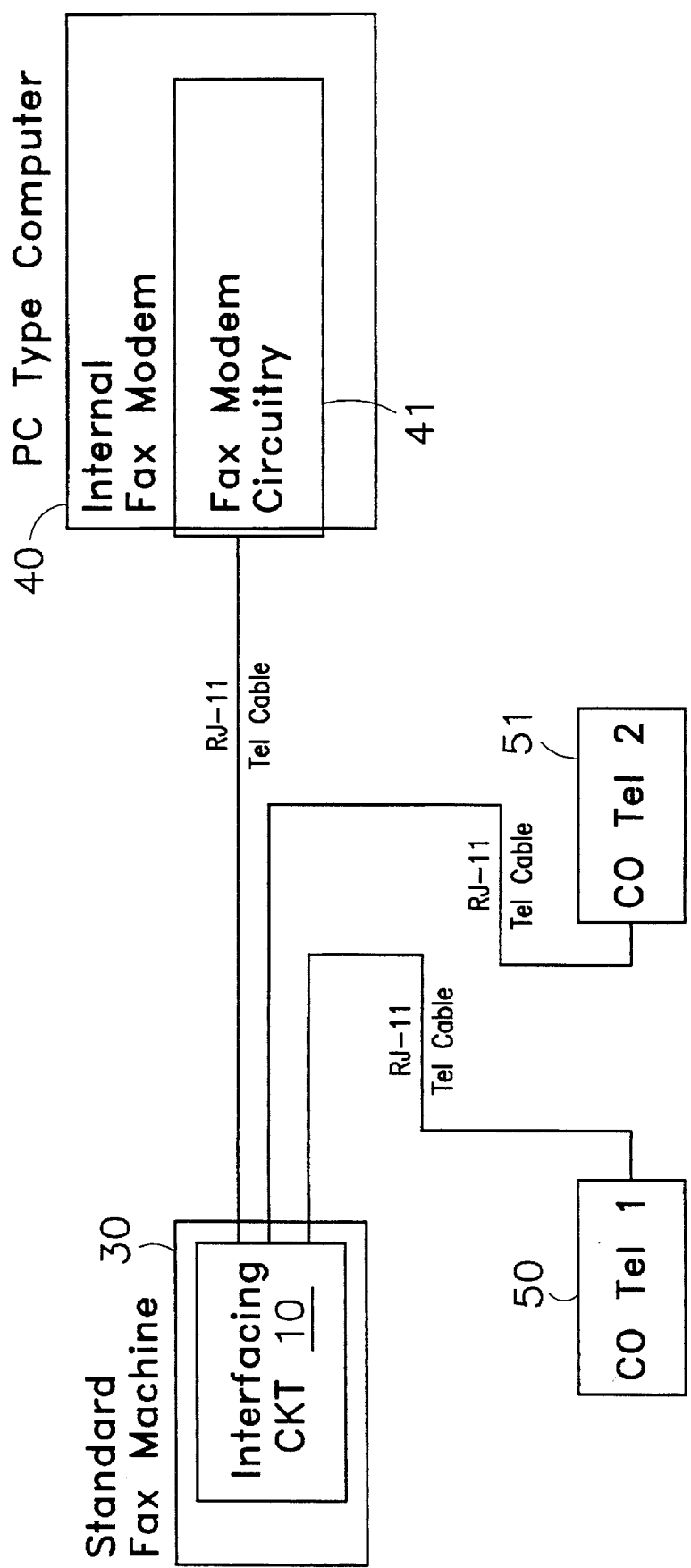

FIG. 2c shows another alternative arrangement in which the circuitry 10 of the present invention is integrated into the standard facsimile machine 30. The operation of the arrangement of FIG. 2c is otherwise similar to those shown in FIGS. 2a and 2b.

Figure 2D:
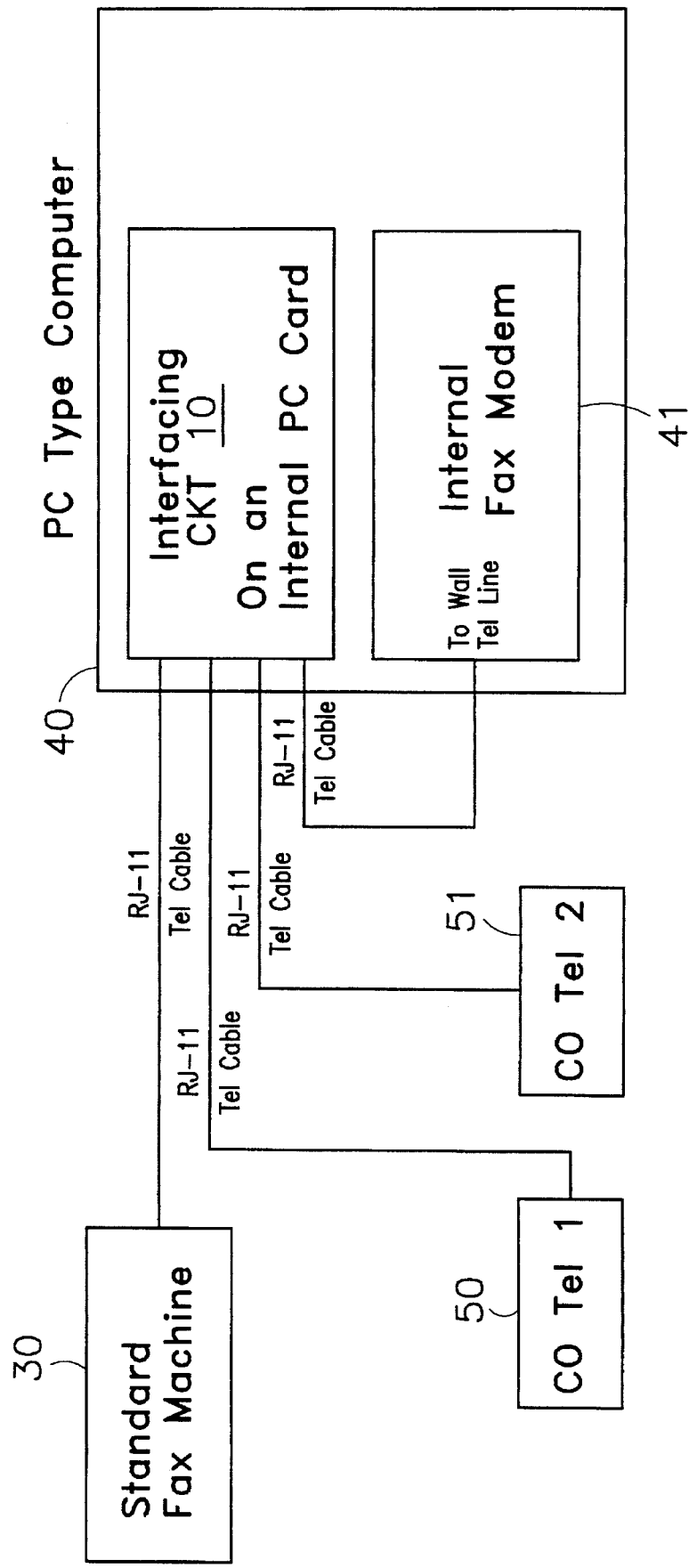

FIG. 2d shows an arrangement in which the circuitry 10 of the present invention is mounted upon its own printed wiring board and is arranged within the PC-type computer 40 and is electrically connected to the internal facsimile modem 41 by an external RJ-11 cable as shown. The operation is otherwise the same as the embodiments of FIGS. 2a–2c described hereinabove.

The circuitry 10 of the present invention may alternatively be placed upon a printed circuit card of approximately a credit card size for insertion in a bus slot provided in present-day PCs enabling the circuit on the printed circuit card, inserted into a slot provided along the exterior of the PC, to be coupled to a PCMCIA bus which is an additional bus that may be addressed by the PC.

Figure 2E:
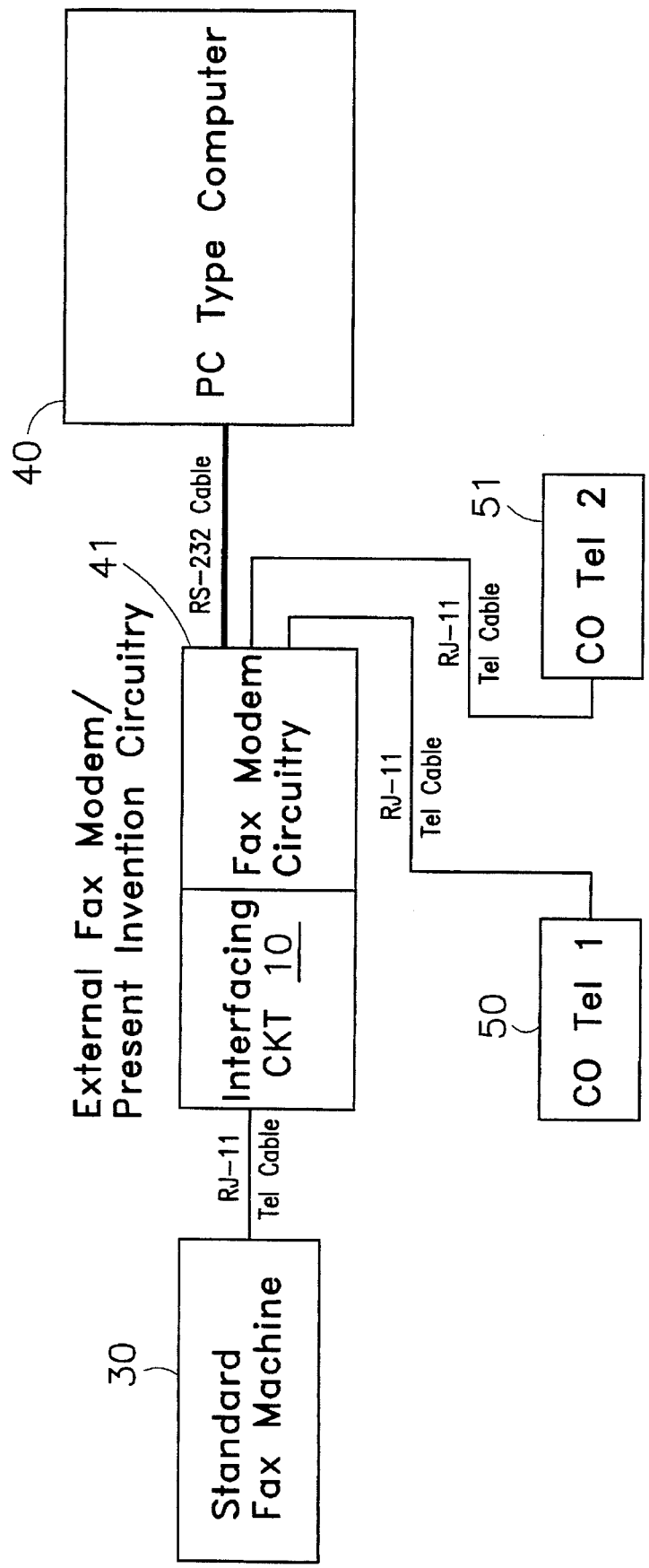

FIG. 2e shows still another arrangement in which the PC-type computer 40 is coupled to external facsimile modem circuitry 41, for example, through an RS-232 cable. The facsimile machine interfaces to the external facsimile modem 41 through circuitry by way of an RJ-11 telephone cable. When in the normal mode of operation, circuitry 10 interfaces central office telephone lines 50 and 51 through the RJ-11 telephone cables as shown. Cable 50 may be employed for standard facsimile machine telephone communications while telephone line 51 is used for the external facsimile modem circuitry. If only one central office telephone line is available, line 50 may be shared in the manner previously described.

Figure 1A:
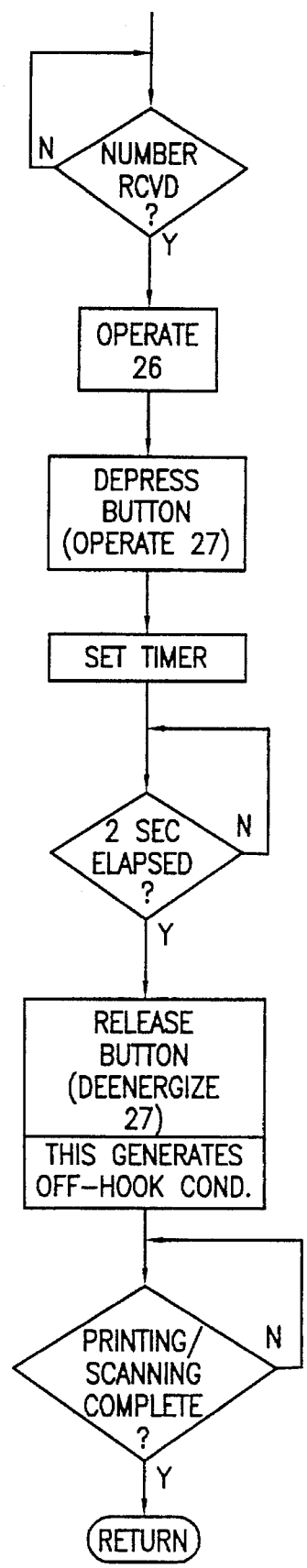
FIG. 1a is a flow diagram of the circuitry of FIG. 1 employing the microprocessor-based tone detecting circuit of FIG. 1.

To further automate the operation of the present invention, the circuitry 10 of FIG. 1 may be provided with device 25 which includes an automatic tone detector circuit for receiving a unique number dialed by either the facsimile machine or the PC modem. Upon recognition of the unique number, the tone receiver operates a driver circuit 26 for operating switch SW2 to decouple the PC and the facsimile machine from their associated telephone lines and for connecting the PC to the facsimile machine. Driver circuit 26 may be a relay or its equivalent for operating an armature (not shown) to move the switch arms between their two operating states. Driver unit 27 which likewise may be a relay or its equivalent, operates the switch SW1 to the position energizing the ringing circuit 14. A timer is set and when two seconds elapses, unit 27 is deenergized causing the off-hook signal to be generated by current generator circuit 12 through the release of the operating button. When printing or scanning is complete, the tone receiver unit is reset. A simplified flow diagram of the aforementioned operation is shown in FIG. 1a.

The circuitry of the present invention is highly simplified in design and provides effective communication between the PC and local facsimile machine enabling the local facsimile machine to provide the dual functions of operating independently for transmission or reception to remote facsimile machines as well as functioning as a scanner or printer with a local PC. The circuitry of the present invention provides all the necessary signal conditions which lead the PC and local facsimile machine to believe that they are communicating with one another over a telephone line. The facsimile machine, although operating in its normal fashion, functions very effectively as a scanner or printer as and when needed and provides a scanning or printing capability at a mere fraction of the cost of conventional scanners or printers.

Simple switching of SW2 returns the PC and facsimile machine to normal use.

The novel ring circuit provides the required ring signal which is conventional in present-day facsimile transmission application through the employment of an inexpensive, low voltage, DC battery or 9 V power source and, through the operation of two switches incorporated in the novel interface circuitry of the present invention, followed by operation of the facsimile start switch, provides an interface circuit which is extremely easy to use and which eliminates the need for more complicated and expensive microprocessor-based devices.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A device for coupling a facsimile machine with a personal computer, comprising:

first switch means having a normal mode position for electrically isolating the facsimile machine from the computer and coupling the computer and facsimile machine to at least one local telephone line and a scan/print mode position for directly electrically connecting the facsimile machine to the computer and isolating the computer and facsimile machine from the telephone line;

second switch means normally biased to a first switch position and having a manually operable switch member for moving said second switch means against said bias to a second position;

a small, low voltage DC source;

current generator means having an input and an output, said output being coupled to said facsimile machine;

ring generating means for generating a sinusoidal ring signal of a predetermined frequency and amplitude when coupled to said DC source; and said second switch means including means for coupling said DC source to said ring generating means and for coupling the sinusoidal ring signal of said ring generating means to said computer when said manually operable switch member is moved to said second position and for decoupling said DC source from said ring generating means and decoupling the ring generating means from said computer and for coupling said DC source to said current generating means responsive to return of said second switch means to said first position, upon release of said manually operable switch member;

whereby the output of said ring generating means causes said computer to enter a scanning or print mode and subsequent application of said constant current to said facsimile machine and computer simulates an off-hook condition enabling the facsimile machine to transmit data presented in a document scanned by the facsimile machine to said computer or to transmit data from said computer to be printed by the facsimile machine responsive to a simulated off-hook condition.

2. The interface device of claim 1 wherein said ring generating means further comprises means for generating positive-going pulses;

transformer means; and bridge circuit means coupling said transformer means to said ring generating means, said bridge means and paid transformer means cooperating to convert said positive-going pulses into a substantially sinusoidal signal of a given amplitude and frequency.

3. The interface device of claim 1 wherein said current generator circuit comprises a series circuit coupled between said first and second switch means and includes semiconductor means and current limiting means for generating a constant current and light emitting means coupled in series with said semiconductor means and being illuminated when said second switch means is in said first position.

4. The interface device of claim 1 wherein said first switch means comprises a four-pole, double-throw switch assembly.

5. The interface device of claim 1 wherein said second switch means comprises a three-pole, double-throw switch assembly.

6. The interface device of claim 15 wherein said switch assembly is further characterized by comprising three switch arms (SW1-1, SW1-4, SW1-7) being ganged together to operate under the control of an operating member (B1); and bias means normally urging said three switch arms to said first positions.

7. The interface device of claim 4 wherein said four-pole, double throw switch assembly is further characterized by comprising four switch arms being ganged together to operate under the control of said operating member; and said four movable switch arms are movable to either a first or second position respectively corresponding to a normal mode position and a scan/print mode position.

8. The interfacing device of claim 1 further comprising:

automatic tone detector circuit means for detecting a unique number dialed from either the facsimile machine or the PC modem to automatically activate first and second relay means;

said first relay means, when activated, operating said first switch means to said scan/print mode;

said second relay means, when activated, operating said second switch means to said second switch position;

timing means energized responsive to activation of said second relay means for generating a signal after a predetermined time interval, between one and two seconds; and means for deactivating said second relay means responsive to timing out of said timing means whereby said second switch means returns to said first switch position.

9. The interfacing device of claim 1 wherein said interface means is provided upon a circuit board arrangement positioned within said PC.

10. The interfacing device of claim 9 wherein said circuit board arrangement includes a facsimile modem-type circuit card.

11. The interfacing device of claim 10 wherein said circuit board arrangement is a PC compatible printed circuit card.

12. The interfacing device of claim 11 wherein said interface means is coupled to the facsimile machine by way of an RJ-11 telephone cable.

13. The interfacing device of claim 1 being mounted upon a circuit board arrangement which is positioned within the facsimile machine.

14. The interfacing device of claim 1 being mounted upon a circuit board arrangement which is combined with standard circuitry of external facsimile modem interface means coupled to the computer by way of an RS-232 connecting means.

15. The interfacing device of claim 1 wherein said interface means is provided upon a circuit board arrangement of standard PCMCIA card size for insertion into a card receiving slot in a PC for coupling the interface means to a PCMCIA bus provided in the PC.

16. A device for coupling a facsimile machine with a personal computer, comprising:

first switch means having a normal mode position for electrically isolating the facsimile machine from the computer and a scan/print mode position for directly electrically connecting the facsimile machine to the computer;

second switch means normally biased to a first switch position and having a manually operable switch member for moving said second switch means against said bias to a second position;

a small, low voltage DC source;

current generator means having an input and an output, said output being coupled to said facsimile machine;

ring generating means for generating a sinusoidal ring signal of a predetermined frequency and amplitude when coupled to said DC source; and said second switch means including means for coupling said DC source to said ring generating means and for coupling the ring signal of said ring generating means to said computer when said manually operable switch member is moved to said second position and for decoupling said DC source from said ring generating means and decoupling the ring generating means from said computer and for coupling said DC source to said current generating means and coupling the current generating means to the computer and facsimile machine responsive to return of said second switch means to said first position, upon release of said manually operable switch member;

whereby the output of said ring generating means causes said computer to enter a scanning or print mode and subsequent application of said constant current to said facsimile machine simulates an off-hook condition enabling the facsimile machine to transmit data presented in a document scanned by the facsimile machine to said computer or to transmit data from said computer to be printed by the facsimile machine responsive to a simulated off-hook condition;

said ring generating means further comprising:

means responsive to said low voltage DC source for generating an adjustably selectable output signal of a given frequency;

phase delay means for delaying said given frequency output signal;

step-up transformer means having primary and secondary transformer windings;

said secondary transformer winding being selectively coupled to said computer through said second switch means; and bridge circuit means for alternately coupling said given frequency signal and said delayed given frequency signal to opposing inputs of said primary winding.

17. The interface device of claim 16 further comprising passive circuit element means for adjusting the output frequency of said adjustable pulse generating means.

18. The interface device of claim 16 wherein said phase delay means comprises adjustable, one-shot multivibrator means.

19. The interface device of claim 18 further comprising passive circuit elements for adjusting the phase delay magnitude of said phase delay means.

20. The interface device of claim 16 wherein said bridge circuit means is comprised of first and second branch circuits;

first ends of said first and second branch circuits having a first end coupled in common to a current limiting resistor;

second ends of said first and second branch circuits being coupled in common to a ground potential;

each of said first and second branch circuits comprising first and second transistors connected in series, each having a control electrode;

each of said branch circuits being coupled to a respective input of said primary winding;

said given frequency pulse signal being coupled to a control electrode of a first transistor in said first branch circuit and being coupled to a control electrode of first transistor in said second branch circuit through inverter means; and said delayed given frequency signal being coupled to the control electrode of the second transistor in said second branch circuit and being coupled to the control electrode of the second transistor in said first branch circuit through inverter means, whereby said first and second branch circuits are rendered conductive in an alternating fashion and said step-up transformer means converts said alternating pulses into a sinusoidal output signal.

21. The interface device of claim 16 wherein said step-up transformer provides a ten to one (10:1) ratio of output signal to input signal.

22. The interface device of claim 16 wherein said step-up transformer input winding comprises a pair of windings coupled in parallel and said output winding comprises a pair of windings coupled in parallel.

23. A ring generating device comprising:

a low voltage DC source;

adjustable pulse generating means responsive to said low voltage DC source for generating an adjustably selectable output signal of a given frequency;

phase delay means for delaying said given frequency output signal;

step-up transformer means having primary and secondary transformer windings;

said secondary transformer winding being selectively coupled to a device for receiving a ringing signal through a switch means; and bridge circuit means for alternately coupling said given frequency signal and said delayed given frequency signal to opposing inputs of said primary winding to generate at an output of the secondary winding a sinusoidal ring signal of the desired frequency and an amplitude greater than an amplitude of the DC source.

24. The ring generating device of claim 23 further comprising passive circuit element means for adjusting the output frequency of said adjustable pulse generating means.

25. The ring generating device of claim 23 wherein said phase delay means comprises adjustable, one-shot multivibrator means.

26. The ring generating device of claim 23 wherein said bridge circuit means is comprised of first and second branch circuits;

first ends of said first and second branch circuits having a first end coupled in common to a current limiting resistor;

second ends of said first and second branch circuits being coupled in common to a ground potential;

each of said first and second branch circuits comprising first and second transistors connected in series, each having a control electrode;

each of said branch circuits being coupled to a respective input of said primary winding;

said given frequency pulse signal being coupled to a control electrode of a first transistor in said first branch circuit and being coupled to a control electrode of first transistor in said second branch circuit through inverter means; and said delayed given frequency signal being coupled to the control electrode of the second transistor in said second branch circuit and being coupled to the control electrode of the second transistor in said first branch circuit through inverter means, whereby said first and second branch circuits are rendered conductive in an alternating fashion and said step-up transformer means converts said alternating pulses into a sinusoidal output signal.

27. The ring generating device of claim 23 wherein said step-up transformer provides a ten to one (10:1) ratio of output signal to input signal.

28. A method of interfacing a computer with a facsimile machine, enabling use of the facsimile machine as a scanner or printer for the computer, comprising the steps of:

(a) operating a first switch assembly from a normal position electrically isolating the computer from the facsimile machine and coupling the computer and facsimile machine to at least one telephone line to a scan/print position coupling said computer to said facsimile machine and isolating the facsimile machine and computer from the telephone line;

(b) momentarily operating a second switch assembly from a normally occupied first position to a second position for activating a ring generating circuit to generate a sinusoidal signal of a given frequency and amplitude and applying said signal to said computer and facsimile machine to cause said facsimile machine to initiate a scan mode or a print mode;

(c) releasing said second switch means after a brief interval, between one and two seconds to return the second contact assembly to the first position to remove said sinusoidal signal from said computer and facsimile machine and activating a constant current generating circuit for generating a constant current and applying said constant current to said computer and facsimile machine to simulate an off-hook condition; and either (d) operating a start button provided on said facsimile machine to initiate a facsimile transmission whereby said facsimile machine transmits signals to said computer representative of information on a document scanned by said facsimile machine responsive to the simulated off-hook condition and operation of the start button; or (e) whereby the computer transmits signals to the facsimile machine when in a print mode, responsive to the simulated off-hook condition.

29. The method of claim 28 further comprising the step of:

storing signals received by said computer in memory means for subsequent use.

30. A method of interfacing a facsimile machine with a computer to cause said facsimile machine to operate as a scanning device, comprising the steps of:

(a) coupling the facsimile machine to the computer and isolating the facsimile machine and the computer from a telephone line;

(b) generating a sine wave signal of a given frequency and amplitude representative of a standard facsimile machine call signal and applying said signal to said computer for a short given time interval, between one and two seconds whereby the computer is conditioned to receive signals representing data on a scanned document;

(c) generating a constant current signal after termination of said sinusoidal signal and applying said constant current signal to said facsimile machine to simulate an off-hook condition whereby the facsimile machine is conditioned to transmit signals representing data on a scanned document; and (d) operating a facsimile machine start button for initiating transmission of said facsimile machine for transmitting information to said computer representative of a document being scanned by said facsimile machine.

31. The method of claim 30 further comprising the step of:

storing signals received by said computer in memory means for subsequent use.

32. A device for interfacing a facsimile machine with a personal computer, comprising:

first switch means having a normal mode position for electrically isolating the facsimile machine from the computer and a print mode position for electrically connecting the facsimile machine to the computer;

second switch means normally biased to a first switch position and having a manually operable switch member for moving said second switch means to a second position;

a small, low voltage DC source;

current generator means having an input and an output, said output being coupled to said facsimile machine; and said second switch means including means for coupling said DC source to said current generator when said manually operable switch member is moved to said second position;

whereby the output of said current generator means simulates an off-hook condition enabling the computer to transmit data from said computer for printing by the facsimile machine.

* * * * *